J. A. DAVIS.
Water-Wheel.

No. 219,348. Patented Sept. 9, 1879.

WITNESSES
Sam'l R. Turner
F. D. Thomason

INVENTOR
James A. Davis
By R. S. & A. P. Lacey
ATTORNEYS

N. PETERS, PHOTO-LITHOGRAPHER, WASHINGTON, D. C.

UNITED STATES PATENT OFFICE.

JAMES A. DAVIS, OF HENDERSON, ALABAMA.

IMPROVEMENT IN WATER-WHEELS.

Specification forming part of Letters Patent No. 219,348, dated September 9, 1879; application filed June 2, 1879.

*To all whom it may concern:*

Be it known that I, JAMES A. DAVIS, of Henderson, in the county of Pike and State of Alabama, have invented certain new and useful Improvements in Water-Wheels; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to so construct the wheel that the entire force of the water will be utilized.

It consists in the peculiar construction of the blades of the wheel, as will be hereinafter fully explained, and pointed out in the claims.

Figure 1:
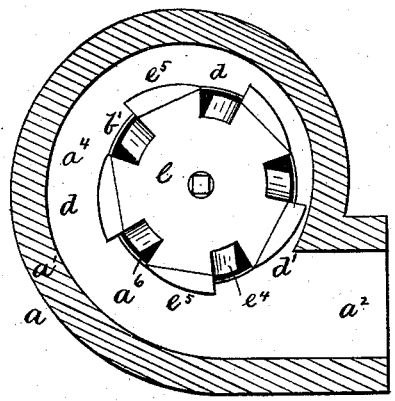
Figure 5:
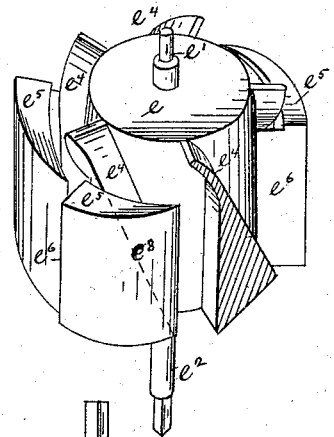
Figure 2:
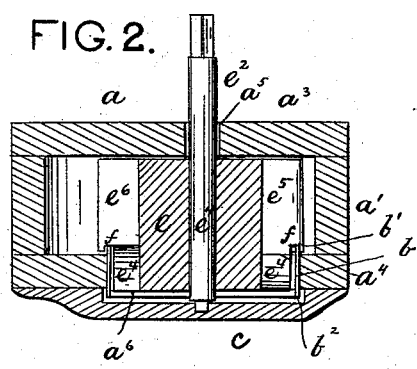
Figure 3:
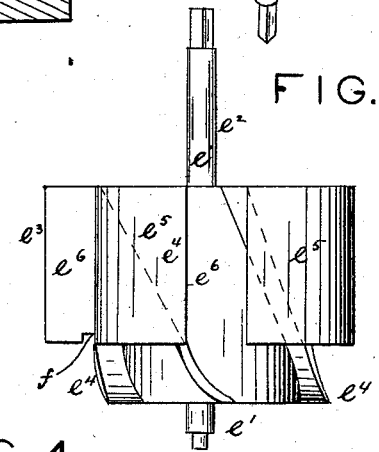
Figure 4:
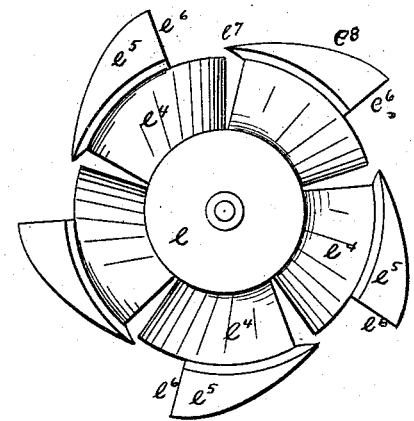

In the drawings, Figure 1 is a plan, and Fig. 2 a vertical section, of the casing and wheel. Fig. 3 is a side elevation; Fig. 4, a plan of the wheel removed from the casing; and Fig. 5 is a perspective of the wheel detached from the casing.

$a$ is the scroll or casing, within which the wheel revolves. It is composed of the ring $a^1$, formed so as to provide the inlet $a^2$, and of the upper and under end plates, $a^3$ $a^4$, all secured together as shown. In the plate $a^3$ there is provided a bearing, $a^5$, for the shaft of the wheel, and in the plate $a^4$ there is formed a large round opening, $a^6$, into which the end of the hub projects, as hereinafter explained.

Within the opening $a^6$ there is fixed a wide hoop or ring, $b$, one edge, $b^1$, of which projects into the casing slightly beyond the inner face of the plate $a^4$, and the other edge, $b^2$, of which projects outward slightly beyond the outer face of said plate $a^4$, as shown in Fig. 2. This ring is the outlet for the water, and it serves also as a guide to give steadiness to the movement of the wheel.

$c$ is a bearing-bar, secured to the plate $a^4$ diametrically across the opening $a^6$ and ring $b$, and in it is journaled one end of the shaft of the wheel.

The opening $a^6$ and the bearing $a^5$ are arranged at one side of the casing, and so as to provide a gradually-diminishing water-passage, $d$, leading from the inlet $a^2$ around the wheel, and ending at the point $d'$, where the wings or blades of the wheel touch or just clear the side of the ring $a^1$, as shown in Fig. 1.

$e$ is the hub, supported on the axis $e^1$, journaled in the bar $c$ and plate $a^3$. The end $e^2$ of the axis projects out of the casing and gives the necessary facilities for connecting with machinery. The hub extends from the plate $a^3$ through the casing and opening $a^6$, its end being flush with the outer face of the plate $a^4$, as shown.

The hub is provided with a series of blades, $e^3$, composed of the curved plates $e^4$ and the wings $e^5$, secured together so as to provide the flat vertical faces $e^6$, formed radially to the axis $e^1$, and against which faces the water impinges. The wings $e^5$ have a length equal to the vertical depth of the chamber within the casing $a$, and they project laterally over the edge of the hoop $b$ and revolve freely within the said chamber. They are made wide from the outer vertical edge of the impinging face $e^6$ to the rear vertical edge, $e^7$, while the outer vertical face, $e^8$, is curved inward, so that the said rear edge $e^7$ is in line with the outer edge of the curved plate $e^4$. This construction completely uncovers the face $e^6$ of the next following blade. The narrow space intervening between the edge $e^7$ and face $e^6$ permits the water to flow freely into the space behind the wing $e^5$ onto the curved plate $e^4$, which discharges it from the casing through the opening $a^6$.

The curved plates or arms $e^4$ project outward from and are of the length of the hub, their lower ends projecting into the ring $b$. On one side they are made with a vertical radial face, which forms a part of the impinging face $a^6$. The opposite or rear side is inclined or curved forward and downward, giving them a spiral form around the hub $e$, as shown in Figs. 3 and 4.

The wings $e^5$ are widest at their front end, and are slightly curved backward and inward, and are secured to the outer ends of the arms $e^4$ in the position shown.

The wings and arms, constructed and arranged as described, provide a wide spiral passage between the blades and between the wings and hub, so that the water, after its force is spent, is discharged without tending to create eddies in the current of the inflowing water.

On the under ends of the wings $e^5$ are formed curved guide-grooves $f$, which fit over the inner edge, $b^1$, of the ring $b$, and give steadiness to the revolution of the wheel.

In this device the water has a "square strike" against the faces $a^6$, giving great power with small quantity of fluid.

Having thus described my invention, what I claim, and desire to secure by Letters Patent, is—

1. The improved wheel, composed of the hub $e$, curved arms $e^4$, and wings $e^5$, arranged to provide a vertical impinging face $e^6$ and a spiral channel or discharge between the blades and between the wings $e^5$ and hub $e$, and supported in a scroll or suitable casing, substantially as set forth.

2. The combination, with the scroll $a$, having opening $a^6$, provided with the ring $b$, the inner end of which projects into the chamber of the scroll, of the hub $e$, provided with curved arms $e^4$, the under ends of which project through the ring $b$, and having the wings $e^5$ secured to the outer ends of the arms $e^4$, and provided with guide-grooves $f$, arranged to operate substantially as set forth.

In testimony that I claim the foregoing as my own I affix my signature in presence of two witnesses.

JAMES A. DAVIS.

Witnesses:
JOHN D. GARDNER,
L. H. BOWLES.